Jan. 6, 1948. H. E. WALLACE 2,434,025
ELECTRODE PROTECTOR FOR WELDING MACHINES
Filed Jan. 22, 1945
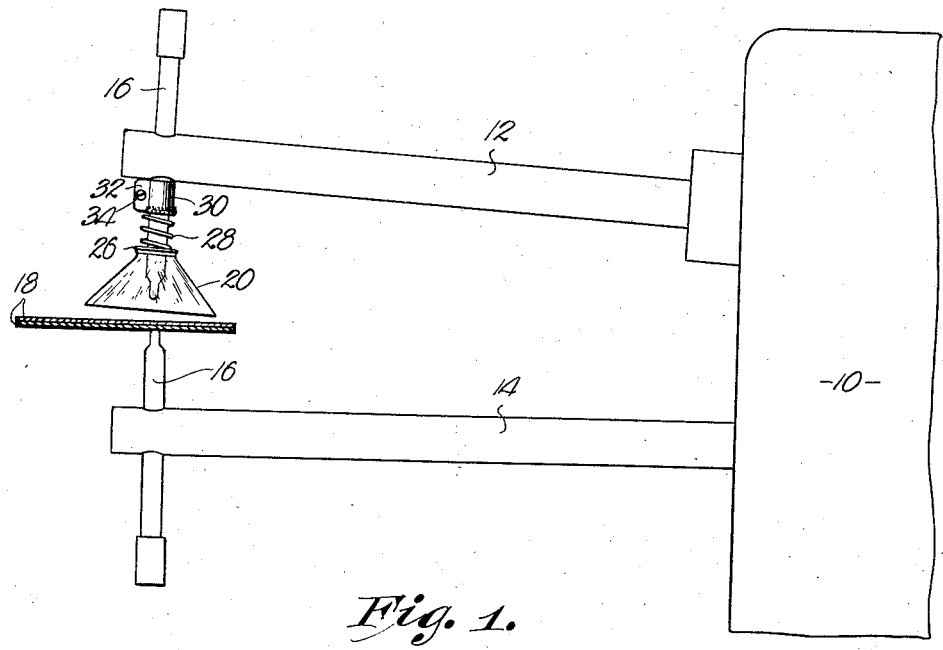
Fig. 1.
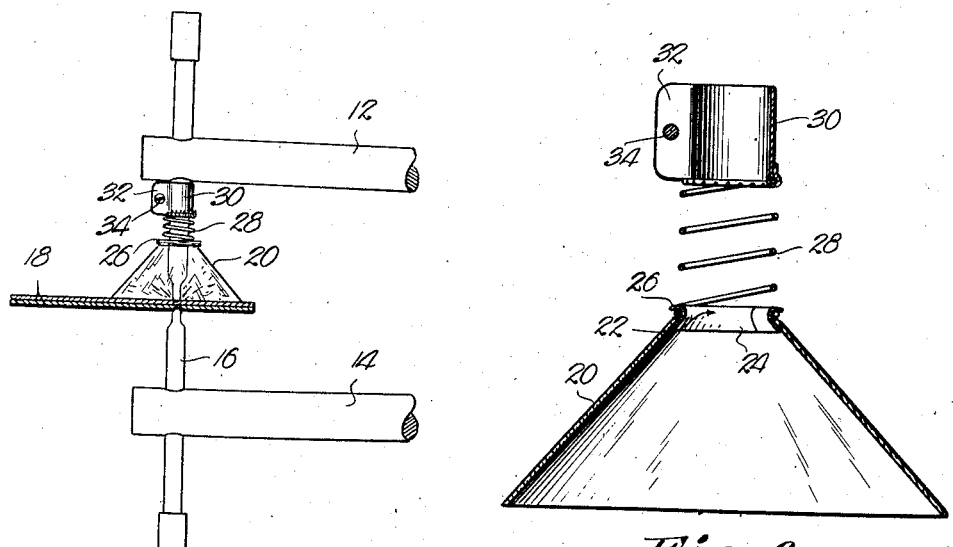
Fig. 2.
Fig. 3.
INVENTOR.
Harold E. Wallace
BY 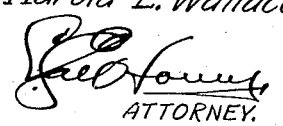
ATTORNEY.

Patented Jan. 6, 1948

2,434,025

UNITED STATES PATENT OFFICE 2,434,025

ELECTRODE PROTECTOR FOR WELDING MACHINES

Harold E. Wallace, Kansas City, Mo., assignor to A. F. Parmalee, doing business as United States Safety Service Co., Kansas City, Mo.

Application January 22, 1945, Serial No. 573,849

4 Claims. (Cl. 219—4)

This invention relates to welding equipment and particularly to attachments having the property of protecting the operator thereof from sparks created due to the action of electrodes upon the work.

One of the important objects of this invention is the provision of an electrode shield for welding machines, the character whereof is such as to permit full and efficient operation of the welder as the operator is protected from the consequences that might occur as a result of sparks thrown from the zone of action as the electrodes of the machine are moved toward and from the work.

More specifically, this invention relates to electrode shields for welding machines, and has for its aims to provide an attachment that will deflect the sparks created during the operation of the equipment; that will allow the operator to view the work even as the zone of action thereon is covered; that will permit the movement of the specially formed shield longitudinally of the electrode, to the end that the tip of the electrode is always within an isolated spot; and that will effectively mount the shield of the protector and thereafter yieldably hold the same to permit free movement thereof.

Other aims of the invention will appear during the course of the following specification, referring to the accompanying drawing wherein:

Fig. 1 is a fragmentary side elevational view of an electrical spot welding machine having the electrode shield or protecting device associated therewith, which shield is made in accordance with the present invention.

Fig. 2 is a fragmentary side elevational view of a welding machine showing the electrode shield in position with the electrode performing work; and Fig. 3 is an enlarged central sectional view through the shield assembly, with the same entirely removed from association with a welding machine.

Welding machine 10 is provided with horns or arms 12 and 14 respectively, each of which mounts an electrode 16. These electrodes are drawn together as one of the arms is shifted and work 18 is positioned between the ends of electrodes 16, as illustrated in Figs. 1 and 2.

When the upper electrode 16 engages the work, sparks are created due to the welding action, and these sparks oftentimes cause damage or injury to the operator.

The shield assembly, about to be described, is attached to upper electrode 16 and has the property of constantly confining the lower end of said electrode where the sparks created thereat will not be thrown beyond the confines of the shield body.

Particularly, the assembly comprises shield body 20 that is formed of transparent material of a non-inflammable nature. The form of body 20 is clearly shown in the drawings and is preferably a truncated cone with a continuously circumscribing wall extending downwardly and outwardly from a reinforcing collar 22. Skirt 24 of collar 22 extends into the body 20 and a marginal curled portion 26 is laterally disposed to establish an annular groove for the reception of one coil of spring 28—thus one end of this spring 28 is secured to body 20 while the opposite end thereof is attached in any suitable fashion to collar 30, the character whereof is such as to permit quick attachment to electrode 16.

In the form of the invention chosen for illustration, collar 30 is longitudinally split and laterally flanged as at 32 to receive a bolt 34 that may be tightened to draw collar 30 into engagement with electrode 16.

Spring 28 is of the open coil type to permit free movement of body 20 as the arm 12 and electrode 16 are moved toward and from work 18. When the lower edge of body 20 comes into engagement with work 18, spring 28 is compressed as illustrated in Fig. 2, and the lower end of electrode 16 moves longitudinally with respect to body 20 and into engagement with the work. As arm 12 is lifted, body 20 is projected outwardly by the normal expansion of spring 28 to insure that the end of electrode 16 is confined within the body.

Manifestly, when body 20 is in that position shown in Fig. 2, the sparks created by the welding action cannot pass beyond the confines of the wall which forms this said body 20, and the operator as well as property in proximity to the welding machine 10 is protected against destructive action.

Visibility is not impaired because of the transparent nature of body 20, and therefore, the use of the shield assembly cannot alter the speed and efficiency with which the machine may be operated.

Shields having physical characteristics other than those shown and described may be made without departing from the spirit of the invention or scope of the appended claims.

Having thus described the invention, what is claimed as new and desired to be secured by Letters Patent is:

1. In a welding machine of the type described, an electrode protector comprising a shield circumscribing the end of the electrode; and structure for supporting the shield for bodily relative movement longitudinally of the electrode, said shield having a portion thereof extending beyond the end of the electrode when the machine is in the normal inoperative position.

2. In a welding machine of the type described, an electrode protector comprising a shield circumscribing the end of the electrode; and resilient structure for supporting the shield for bodily relative movement longitudinally of the electrode, said shield being formed of transparent material and having a continuous, downwardly and outwardly flared wall circumscribing the end of the electrode, said supporting structure being adapted to maintain the shield in place and against the work being contacted by the electrode as the latter is reciprocated toward and from the operative position.

3. In a welding machine of the type described, an electrode protector comprising a shield circumscribing the end of the electrode; and structure, including a spring for supporting the shield for free movement relative to the electrode.

4. A shield assembly for electrodes of welding machines, comprising a conical body of transparent sheet material; a clamp for engaging a portion of the welding machine; and a spring joining the body and clamp, said spring and body being in circumscribing relation with the electrode of the welding machine said spring forming the sole support for the body.

HAROLD E. WALLACE.

REFERENCES CITED

The following references are of record in the file of this patent:

UNITED STATES PATENTS

| Number | Name | Date |
|---|---|---|
| 1,716,096 | Weeks | June 4, 1929 |
| 2,194,573 | Schulz | Mar. 26, 1940 |
| 2,170,211 | Osborne | Aug. 22, 1939 |
| 2,308,055 | Cogsdill | Jan. 12, 1943 |

FOREIGN PATENTS

| Number | Country | Date |
|---|---|---|
| 482,472 | Great Britain (2) | Mar. 30, 1938 |
| 458,197 | Great Britain (1) | Dec. 15, 1936 |